United States Patent [19]
Yuki

[11] Patent Number: 5,812,560
[45] Date of Patent: Sep. 22, 1998

[54] MAGNETIC DISK CERTIFIER

[75] Inventor: Hidetsugu Yuki, Odawara, Japan

[73] Assignee: Hitachi Electronics Engineering Co., Ltd., Japan

[21] Appl. No.: 896,427

[22] Filed: Jul. 17, 1997

[30] Foreign Application Priority Data

Jul. 19, 1996 [JP] Japan ................................. 8-208858

[51] Int. Cl.$^6$ .................................................. G06F 11/00
[52] U.S. Cl. ............................................................ 371/21.2
[58] Field of Search ....................... 371/21.2; 395/183.06, 395/183.18, 183.2; 360/45, 53

[56] References Cited

U.S. PATENT DOCUMENTS

5,519,857  5/1996  Kato et al. ............................... 364/225

Primary Examiner—Vincent P. Canney
Attorney, Agent, or Firm—Fay, Sharpe, Beall, Fagan, Minnich & McKee

[57] ABSTRACT

A magnetic disk certifier according to the present invention is featured by comprising a write circuit for writing a test data having a period which is 1/n of a bit period of the test data, error of which is to be detected, in a magnetic disk, where n is an integer equal to or larger than 2, a read-out circuit for reading out the test data written in the magnetic disk, a comparator circuit for producing a detection signal by comparing a read-out signal read out from the read-out circuit with a predetermined signal or a predetermined reference level and an error detector circuit for detecting an error by receiving the detection signal from the comparator circuit with a period which is n times the bit period of the test data written in the magnetic disk, a bit data of an error detected by the error detector circuit being used as an error signal by converting each bit of the bit data into n bits.

13 Claims, 6 Drawing Sheets

MAGNETIC DISK CERTIFIER

DESCRIPTION

1. Technical Field

The present invention relates to a magnetic disk certifier and, particularly, to an improvement of a magnetic disk certifier (referred to as "certifier", hereinafter) for testing a magnetic disk memory medium on errors of electric characteristics thereof such as missing error and/or spike error to make the magnetic disk certifier possible to perform a high precision error test by merely adding a simple circuit thereto.

2. Background Art

A hard magnetic disk (referred to as "magnetic disk", hereinafter) for recording an information is certified on quality by a magnetic disk certifier which tests a magnetic disk on electrical defect thereof and significance of the defect.

Figure 4:
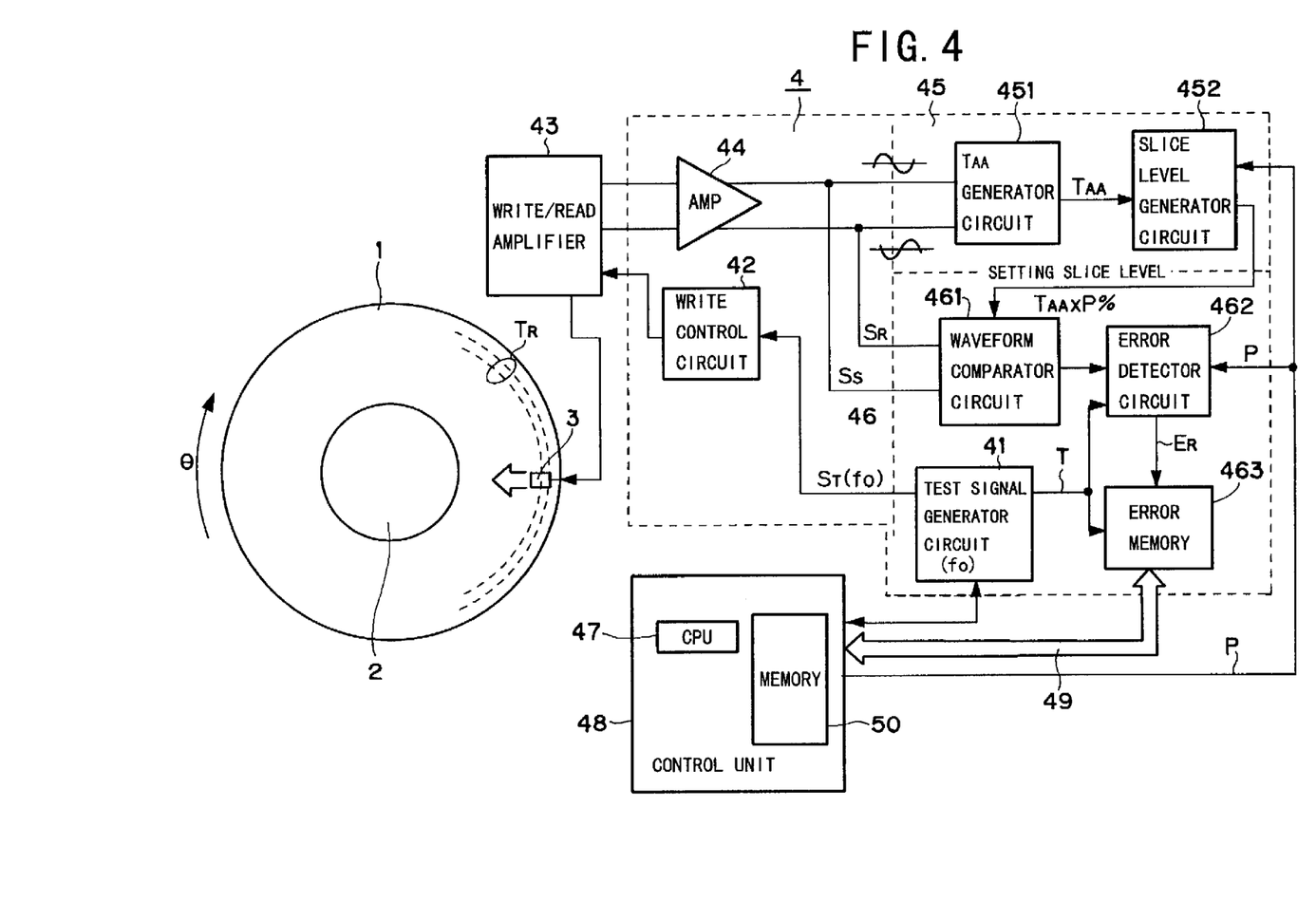
FIG. 4 is a block circuit diagram of a conventional magnetic disk certifier.

FIG. 4 is a block circuit diagram of a conventional magnetic disk certifier 4. A magnetic disk 1 is rotatably mounted on a spindle 2 and a test signal $S_T$ having a frequency $f_O$ generated by a test signal generator circuit 41 of the magnetic disk certifier 4 is supplied to a write control circuit 42. A test data is generated correspondingly to the test signal $S_T$ in the write control circuit 42 and is supplied to a write/read amplifier 43 in which the test data is converted into a write current having a predetermined level and sequentially written in respective tracks $T_R$ of the magnetic disk 1 through a magnetic head 3.

After the test data is written in all of the tracks $T_R$ on the magnetic disk 1, the written test data are sequentially read out by the magnetic head 3 as a positive and negative phase signals through the write/read amplifier 43 and sent to a level regulating amplifier (AMP) 44. A positive and negative phase signals $S_S$ and $S_R$ which correspond to the test signal $S_T$ having frequency $f_O$ and are output from the level regulating amplifier 44 are supplied to a slice level setting circuit 45 and a defect detector circuit 46 as read-out signals.

Incidentally, the read-out signal $S_S$ is a signal having frequency corresponding to the frequency of the test signal $S_T$. When all of bits of the test data to be produced are "1", the frequency of the read-out signal becomes one half of the bit frequency of the test data. This is because the write circuit outputs a write current which magnetizes the magnetic head alternately every test data bit to write the test data in the magnetic head. Therefore, the frequency of the written signal also corresponds to the frequency of the test signal $S_T$.

The slice level setting circuit 45 includes a track average amplitude generator circuit (referred to as "$T_{AA}$ generator circuit", hereinafter) 451 for generating an average voltage value for one track and a slice level generator circuit 452. The $T_{AA}$ generator circuit 451 generates a track average amplitude, that is, a peak to peak average voltage value for one track of the read-out signal 1. There may be a case where the $T_{AA}$ voltage value is calculated on the positive side of the read-out signal and on the negative side, independently.

The $T_{AA}$ generator circuit 451 includes, for example, an envelope detector circuit, an integrator circuit for integrating voltage for one complete track and a peak detector circuit, etc., all of which are not shown. The $T_{AA}$ voltage value output from the $T_{AA}$ generator circuit 451 is supplied to the slice level generator circuit 452. The slice level generator circuit 452 generates a voltage value which is a predetermined fraction or percentage (%) of the output voltage level of the $T_{AA}$ generator circuit 451 as a threshold value, that is, a slice level. The predetermined fraction or percentage is set by a signal P supplied from a CPU 47 of a control unit 48. The slice level signal generated by the slice level generator circuit 452 is sent to a defect detector circuit 46. The slice level signal is a voltage signal $T_{AA} \times P$ % where $T_{AA}$ is a voltage value of the output signal $T_{AA}$ of the $T_{AA}$ generator circuit 451 (cf. chain lines and solid lines in FIG. 6(a)).

The defect detector circuit 46 includes, in addition to the test signal generator circuit 41, a waveform comparator circuit 461, an error detector circuit 462 and an error memory 463. The error detector circuit 462 is constructed with a gate circuit. In a case of the missing test, for example, the error detector circuit 462 counts period T/4 pulses generated by a period T of a timing pulse signal T, which respectively correspond to bits of the test data supplied from the test signal generator circuit 41, for a period of the detection signal obtained from the waveform comparator circuit 461 as a window pulse having a predetermined set period, for example, 1.5 t±α (where t is a bit period of the test data and α is tolerance in which the peak is allowed to shift) and outputs a bit error signal $E_R$ in synchronism with the timing signal T when there is no output of the waveform comparator circuit 461.

On the other hand, in a case of the spike error detection, the error detector circuit 462 outputs the bit error signal $E_R$ when the detection output of the waveform comparator circuit 461 is generated in the preset period 1.5 t±α. Incidentally, the test is selectively switched between the missing test and the spike error test by the error detector circuit 462 according to the control signal from the CPU 47.

As mentioned, the defect detector circuit 46 requires a high precision timing circuit for setting the period for error judgement. Therefore, the frequency of the test signal $S_T$ is strongly related to this timing circuit.

The bit error signal $E_R$ output from the error detector circuit 462 indicates an absence of error when it is "0" and a presence of error when it is "1" and is sent to the error memory 463. The bit error signal indicative of presence of error will be referred to as "error detection bit". The error memory 463 responds to the timing signal T from the test signal generator circuit 41 to sequentially update addresses thereof and sequentially stores the bit signals "1" and "0" output from the error detector circuit 462 in the updated addresses as defect data.

The CPU 47 reads the content of the error memory 463 in the memory 50 through a bus 49 at a time when the test of the whole tracks of the magnetic disk 1 completes and evaluates the quality of the magnetic disk 1 according to the content of the error memory 463.

Figure 5:
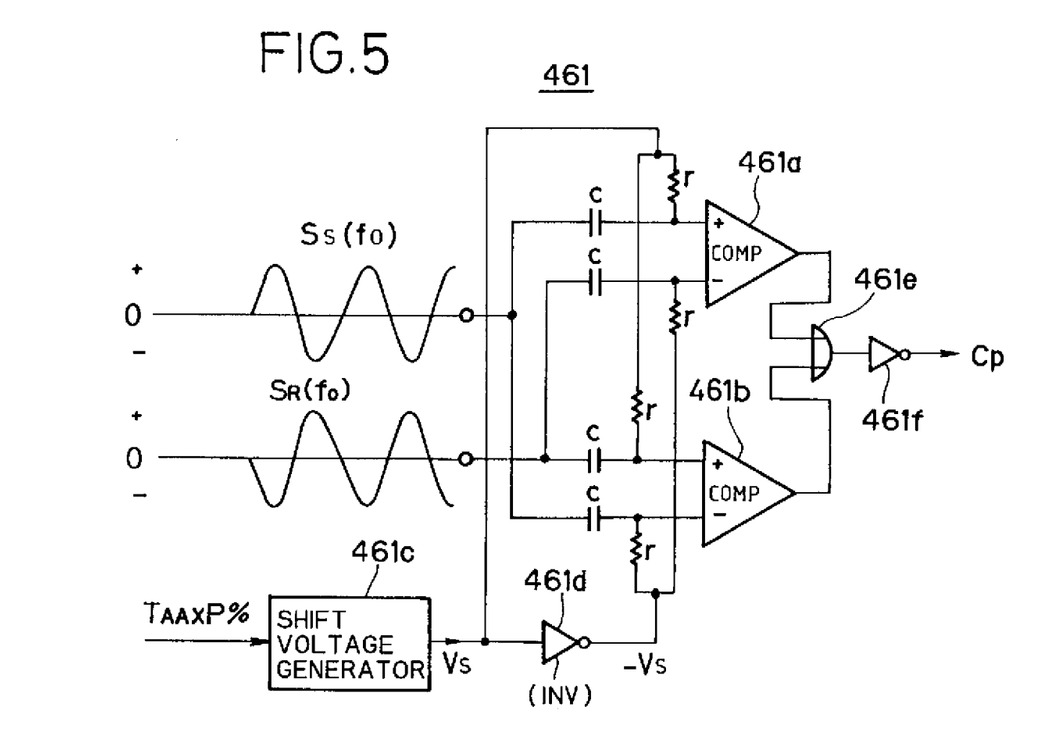
FIG. 5 is a block circuit diagram of a defect detector circuit of the conventional magnetic disk certifier shown in FIG. 3.

FIG. 5 is a general circuit diagram of the waveform comparator circuit 461. This circuit includes a pair of comparators for detecting crossings of the positive phase read-out signal and the negative phase read-out signal.

In detail, the waveform comparator circuit 461 includes the comparators (COMP's) 461a and 461b, a shift voltage generator 461c, an inverter (INV) 461d, an OR circuit 461e, an inverter 461f and, as an input circuit of the comparators, a plurality of capacitors c and a plurality of resistors r, as shown in FIG. 5.

The comparator 461a has a +input terminal supplied with the positive phase read-out signal $S_S$ having frequency $f_O$ and a shift voltage $+V_S$ generated by the shift voltage generator 461c through the capacitor c and the resistor r and a −input terminal supplied with the negative phase read-out signal $S_R$ having frequency $f_O$ through the capacitor c and a voltage $-V_S$ obtained by inverting the shift voltage $V_S$ by the inverter 461d through the resistor r. Similarly, the comparator 461b has a +input terminal supplied with the negative phase read-out signal $S_R$ having frequency $f_O$ through the capacitor c and the shift voltage $+V_S$ through the resistor and a −input terminal supplied with the positive phase read-out signal $S_S$ having frequency $f_O$ through the capacitor c and the voltage $-V_S$ through the resistor r.

The shift voltage generator 461c functions to divide the input voltage signal $T_{AA} \times P(\%)$ set as the slice level by two and outputs it as the voltage $V_S$ for setting a reference amplitude level for the positive phase read-out signal $S_S$ and the negative phase read-out signal $S_R$. The voltages $V_S$ and $-V_S$ provide detection threshold values with respect to the read-out signals as will be described later.

Figure 6A:
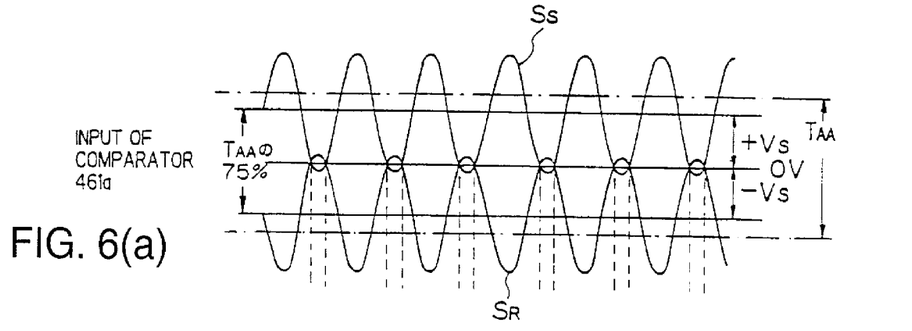

Describing an operation of the comparators 461a and 461b with reference to FIGS. 6(a) to 6(f), crossings of a negative side portion of the positive phase read-out signal $S_S$ with respect to the reference amplitude level $+V_S$ and a positive side portion of the negative phase read-out signal $S_R$ with respect to the reference amplitude level $-V_S$ are detected as shown in FIG. 6(a). That is, this circuit detects the negative side portion of the read-out signal which is below the threshold value $-V_S$.

FIG. 6(a) shows the waveforms of the input signals to the comparator 461a in a case where P=75(%), that is, the slice level is set at 75% of $T_{AA}$, that is, $V_S=T_{AA} \times 75\%/2$. The read-out signal $S_S$ having frequency $f_O$ and input to the +input terminal of the comparator 461a is shifted upward by the shift voltage $+V_S$ and the reference amplitude potential thereof is increased by $+V_S$ with respect to ground potential (GND) which is 0 V. On the other hand, the read-out signal $S_R$ having frequency $f_O$ and input to the −input terminal of the comparator 461a is shifted downward by the shift voltage $-V_S$ and the reference amplitude potential thereof is lowered by $-V_S$ with respect to ground potential (GND). The comparator 461a compares only the negative side portion of the read-out signal $S_S$. That is, when the wave height value of the read-out signal $S_R$ is not smaller than the wave height value of the read-out signal $S_S$, in other words, when these read-out signals are crossed each other, the comparator 461a outputs a low (L) level signal (cf. FIG. 6(b)). On the contrary, when the wave height value of the read-out signal $S_R$ is not larger than the wave height value of the read-out signal $S_S$, the output of the comparator 461a is maintained at high (H) level providing no output.

Figure 6B:
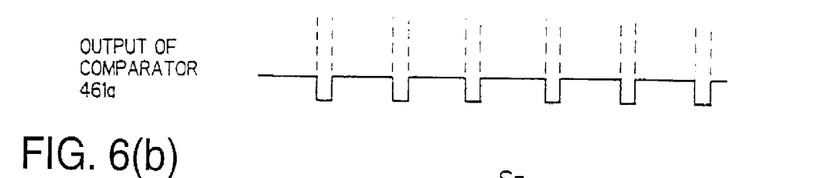

Therefore, the comparator 461a provides the detection output when the negative phase read-out signal $S_S$ is larger than $T_{AA} \times 75\%$ That is, the comparator generates a pulse when the read-out signal exceeds 75%, as shown in FIG. 6(b).

On the other hand, the comparator 461b detects crossings of the positive side portion of the positive phase read-out signal $S_S$ with respect to the reference amplitude level $-V_S$ and the negative side portion of the negative phase read-out signal $S_R$ with respect to the reference amplitude level $+V_S$. That is, this circuit detects the positive side portion of the read-out signal which is not below the threshold value $+V_S$.

Figure 6C:
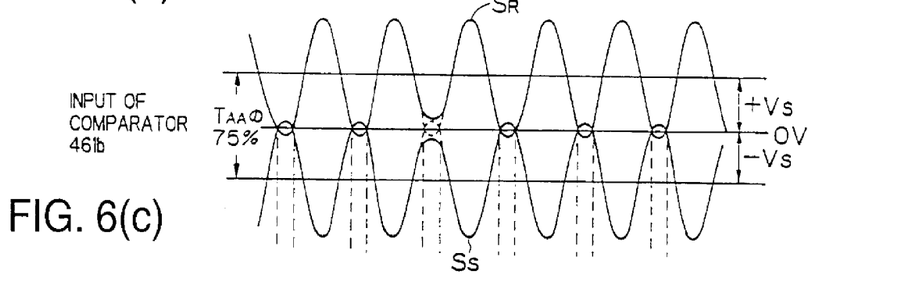
Figure 6D:
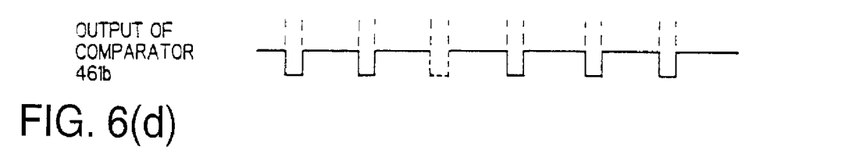
Figure 6E:
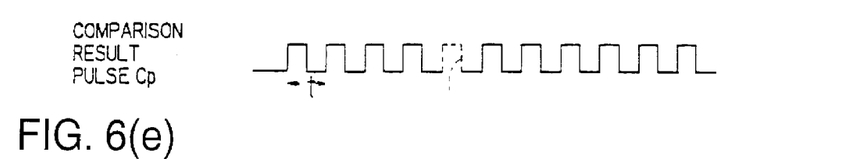

FIG. 6(c) shows the waveforms of the input signals to the comparator 461b. Contrary to the case of the comparator 461a, the positive phase read-out signal $S_S$ input to the −input terminal is lowered by $V_S$ with respect to ground potential (GND) and the negative phase read-out signal $S_R$ input to the +input terminal is increased by $+V_S$ with respect to ground potential (GND). The comparator 461b compares only the negative side portion of the read-out signal $S_R$ and, when the wave height value of the read-out signal $S_S$ is not smaller than the wave height value of the read-out signal $S_R$, in other words, when these read-out signals are crossed each other, outputs a low (L) level signal (cf. FIG. 6(c)). On the contrary, when the wave height value of the read-out signal $S_S$ is not larger than the wave height value of the read-out signal $S_R$, the output of the comparator 461b is maintained at high (H) level providing no output.

Therefore, the comparator 461b provides the detection output when the positive phase read-out signal $S_S$ is larger than $T_{AA} \times 75\%$, as in the case of the comparator 461a. That is, the comparator generates a pulse when the read-out signal exceeds 75%, as shown in FIG. 6(c).

With these two comparators with the slice level being set to P=75%, it is possible to detect the read-out signal having amplitude exceeding the threshold value which is set to 75% of the $T_{AA}$.

Besides this waveform comparator circuit, there is a waveform comparator circuit which is shown as a prior art in FIG. 7 of U.S. patent application Ser. No. 08/771,156 assigned to the same assignee as that of the present application. In the prior art waveform comparator, levels of positive and negative peaks of a read-out signal are detected by generating reference signals $\pm V$ (=$T_{AA} \times P \%/2$) and setting them directly in comparators as threshold values. Since it is known to set the threshold values $\pm V$ in comparators and obtain a detection signal from the comparators when the read-out signal exceeds the threshold values of the comparators or when the read-out signal is smaller than the threshold values thus set, details of the setting of the threshold values and the operation of the comparators are omitted.

The positive and negative peaks of the read-out signal correspond to bits of the test data, respectively. Therefore, the detection is performed for respective bits of the test data by means of the comparators 461a and 461b. The detection signals from the comparators 461a and 461b (FIGS. 6(b) and 6(d)) are ORed by the OR circuit 461e and inverted by the inverter 461f, resulting in a comparison result pulse Cp (FIG. 6(e)) which is supplied to the error detection circuit 462.

Therefore, in the missing test, the comparison result signal Cp is generated as a normal signal when the both comparators 461a and 461b generate the output pulses. On the other hand, the spike error test is performed with P being set larger than 100%, for example, 125%, of $T_{AA}$, in which case, the generation of pulse Cp means the generation of error detection signal and no pulse Cp generated means the generation of normal signal.

Figure 6F:
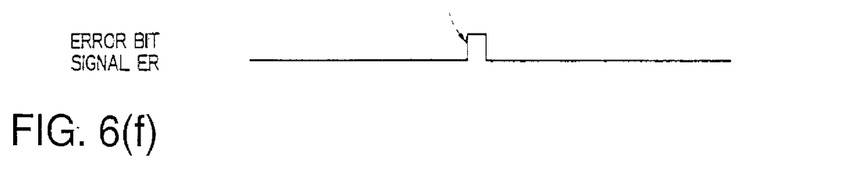

In the error detection circuit 462, when the error is detected according to the relation between the window pulse generated with 1.5 t±α and the pulse Cp, an error bit signal ER is output as shown in FIG. 6(f).

As mentioned previously, the frequency $f_O$ of the test signal $S_T$ is a half of the frequency of the test data "FFh" where h means hexadecimal notation and FF depicts data having bits all of which are "1", and the frequency $f_O$ is the write frequency for the magnetic disk. Although this frequency was as low as 7.5 MHz in the early time, it has been stepped successively up to a high frequency, for example, 25 MHz with the continuous increase of the memory density of the magnetic disk and there is a tendency of further increase of the frequency up to, for example, 50 MHz with a further possible increase of the memory density of the magnetic disk, while the error detection circuit of the defect test circuit 4 is usually designed in concomitant with the write frequency from 7.5 MHz to 25 MHz. Although there are practically some testers which can process the increased frequency of the test signal $S_T$, there are certifiers whose processing circuits must be improved on electric characteristics or changed to those having performances high enough to process such increased frequency. In the latter case, it becomes more difficult to set a setting time for error detection in the error detection circuit among others with the increase of the test signal frequency and so erroneous detection tends to occur.

SUMMARY OF THE INVENTION

An object of the present invention is to provide a magnetic disk certifier capable of detecting defects at a higher frequency by merely adding a simple circuit to the magnetic disk certifier.

In order to achieve the above object, the magnetic disk certifier according to the present invention is featured by comprising a write circuit for writing a test data having a period which is one n-th of a bit period of the test data an error of which is to be detected, where n is an integer equal to or larger than 2, a read circuit for reading the test data written in the magnetic disk, a comparator circuit for comparing a read signal read out from the read circuit with a predetermined signal level or a predetermined reference level to produce a detection signal and an error detector circuit for receiving the detection signal output from the comparator circuit with a period which is n times the bit period of the test data to detect an error of the test data, one bit of the bit data for an error detected by the error detector circuit being made n bits as the error data.

The higher the recording density of the magnetic disk is generally the smaller the detection unit of a defect of the magnetic disk. A defect which is detected by a single bit in the conventional magnetic disk certifier may be detected by a plurality of successive bits and the number of bits may be increased with increase of the recording density.

The present invention is based on this point. That is, it can be said that, in the high density recording, the defect to be detected every write bit is detected by not a single bit but a plurality of successive bits. Therefore, it is possible to detect a defect by testing every bit but one.

In the present invention, a test data having a bit period which is 1/n of the bit period of the test data to be detected is produced from a test signal having a frequency $n \times f_O$ obtained by multiplying the frequency $f_O$ of the test signal corresponding to the bit period of the test data to be detected by n, is written in the magnetic disk and is read out from the magnetic disk. A read-out signal is compared by the comparator circuit with the predetermined reference level, the detection signal output from the comparator circuit is received with the period which is n times the bit period of the test data written in the magnetic disk and the error detection is performed by the error detector circuit with a similar timing to that used in the conventional certifier. Therefore, there is no need of modifying the error detector circuit so that it operates with a special timing.

The pulse width of the detection signal practically detected from the comparator circuit becomes smaller when the frequency of the test signal is n times the frequency $f_O$ of the test signal. This fact can be compensated for by setting the detection threshold value or the amplification of the read-out circuit, etc., appropriately, or regulating the value of $\alpha$ of the predetermined setting period 1.5 t±α, appropriately.

When n is 2, the circuit construction of the magnetic disk certifier according to the present invention becomes simpler compared with the conventional construction which requires two comparators, since a single comparator can generate a detection signal having a period which is twice the test data bit period.

On the other hand, when n is larger than 2, the present invention requires two comparators since the detection must be performed at respective peaks of the positive and negative side waveforms of the read-out signal. In such case, however, the error detector circuit can receive a detection signal having a period which is n times that of the test data bit period by sending the detection signals from the respective comparators to the error detector circuit through a (n−1) bit thinner circuit.

In the present invention, it is assumed that, when one defect is detected, a negative or positive side waveform of the read-out signal subsequent to the detection of the defect is also defective. Further, in the present invention, the error detection bit frequency can be as low as that of the conventional certifier. That is, the error detector circuit for the test frequency which is one n-th of the write frequency can perform a similar test for the write test frequency having n times frequency.

As a result, it becomes possible to use an error detector circuit similar to that used in the conventional certifier, the setting of the detection timing becomes not severe even in a test at high frequency and erroneous detection hardly occurs. Further, it is possible to realize a certifier whose reliability is not lowered even at high frequency.

BRIEF DESCRIPTION OF THE DRAWINGS

FIGS. 6(*a*) to 6(*f*) are waveforms for explaining an operation of the defect detector circuit of the conventional magnetic disk certifier, in which FIG. 6(*a*) is an input signal waveform to one of comparators which compares a negative side waveform, FIG. 6(*b*) shows an output of the comparator, FIG. 6(*c*)is an input signal waveform to the other comparators which compares a positive side waveform, FIG. 6(*d*) shows an output of the other comparator, FIG. 6(*e*) shows an output signal of a waveform comparator circuit and FIG. 6(*f*) shows an error signal.

DESCRIPTION OF THE PREFERRED EMBODIMENTS

Figure 1:
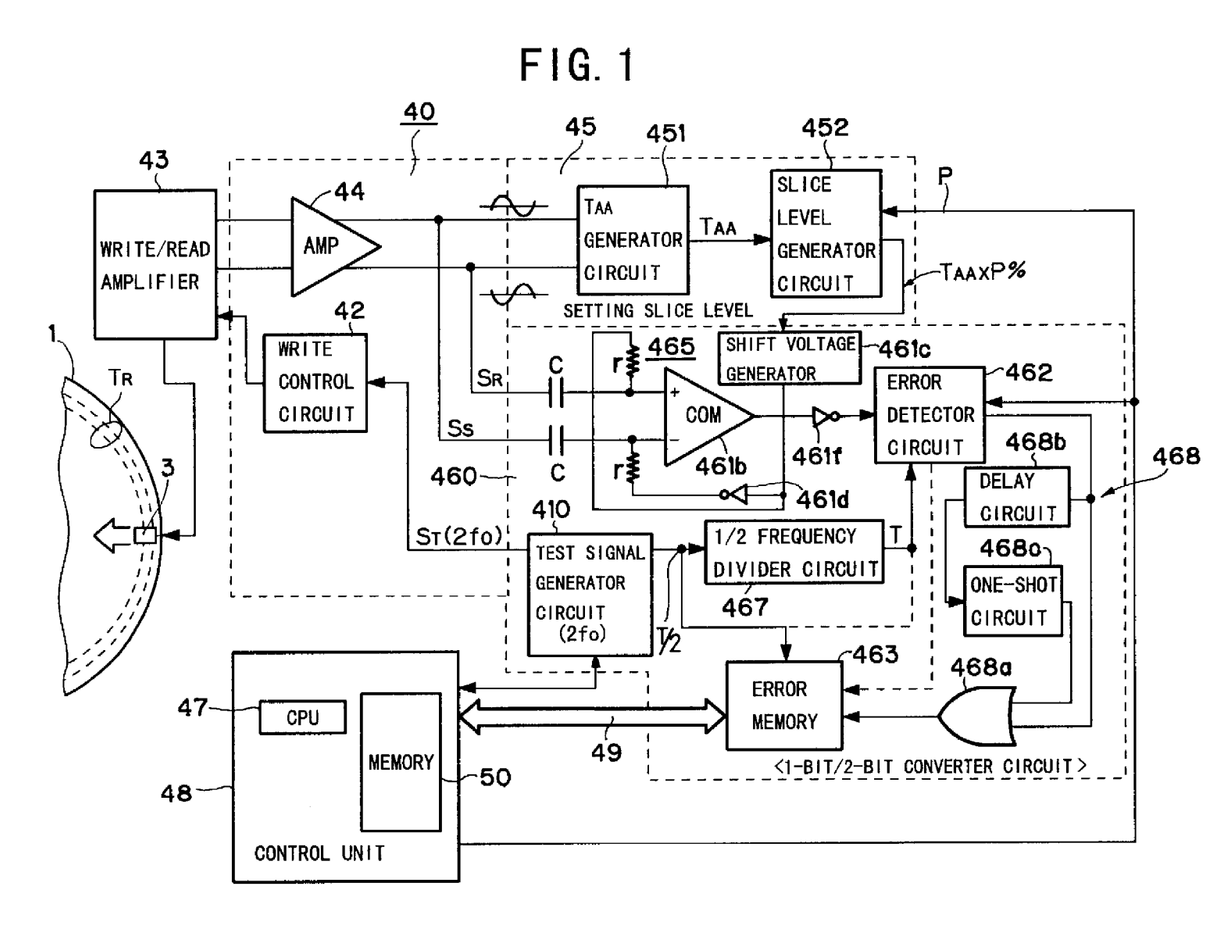
FIG. 1 is a block circuit diagram of a magnetic disk certifier according to a first embodiment of the present invention.

In FIG. 1, a defect certifier circuit 40 according to the first embodiment of the present invention differs from the conventional defect certifier 4 shown in FIG. 4 in that a defect detector circuit 460 is used instead of the defect detector circuit 46 of the conventional defect certifier circuit 4. The defect detector circuit 460 includes a test signal generator circuit 410 which functions to generate a sinusoidal test signal having a frequency which is twice the conventional test signal frequency $f_O$ of 25 MHz, that is, 50 MHz and to record it in a magnetic disk 1. The test data "FFh" obtained from the test signal having frequency $2f_O$ has a frequency which is twice that of the test signal frequency $f_O$ and a period which is one second of that of the test data corresponding to the signal frequency $f_O$. A case where the test signal frequency is $2f_O$ will be described. That is, in FIG. 1, a signal having frequency $2f_O$ is generated by the test signal generator circuit 410 and used as a test signal $S_T$ to be recorded in and read out from the magnetic disk 1. Along with the employment of the test signal generator circuit 410, the defect detector circuit 460 is used instead of the defect detector circuit 46 of the conventional certifier shown in FIG. 4. Since a circuit construction preceding to the defect detector circuit 46 includes circuits such as amplifier which process analog signals mainly, there is no need of substantial changing the circuit construction although the frequency characteristics thereof may be changed more or less. Therefore, in FIG. 1, the same circuit components as those shown in FIG. 4 are depicted by the same reference numerals, respectively, without detailed description thereof.

The defect detector circuit 460 comprises a waveform comparator circuit 465, an error detector circuit 462, an error memory 463, a 1/2 frequency divider circuit 467 and a 1-bit/2-bit converter circuit 468. Constructions and operations of the error detector circuit 462 and the error memory 463 are the same as those of the conventional certifier shown in FIG. 4. The waveform comparator circuit 465 will be described in detail later. The 1-bit/2-bit converter circuit 468 receives a 1-bit output of the error detector circuit 462 and converts it into a 2-bit signal which is sent to the error memory 463. The 1-bit/2-bit converter circuit 468 will be described in detail later.

The 1/2 frequency divider circuit 467 divides the frequency of a timing pulse signal T/2 by two to produce a timing signal T similar to the timing signal used in the conventional certifier shown in FIG. 4, which is supplied to the error detector circuit 462. The timing pulse signal T/2 corresponds in frequency to a write data or test data $S_T$ supplied from the test signal generator circuit 410 to the write control circuit 42 and its frequency is $2f_O$. In this embodiment, a memory capacity of the error memory 463 and an address update speed thereof are twice that of the conventional error memory 463 shown in FIG. 4, respectively.

The waveform comparator circuit 465 includes a single comparator 461*b* which, in this embodiment, corresponds to either one of the comparators 461*a* and 461*b* of the conventional certifier shown in FIG. 5 and checks a positive side waveform, a shift voltage generator 461*c* and an inverter 461*f*. In this embodiment, the comparator 461*b* can check signals having frequency of 50 MHz.

A negative phase read-out signal $S_R(2f_O)$ shifted up by a shift voltage $V_S$ and a positive phase read-out signal $S_S(2f_O)$ shifted down by a shift voltage $V_S$ are supplied to a + input terminal and a −input terminal of the comparator 461*b*, respectively, as in the case of the conventional comparator 461*b* shown in FIG. 5.

Therefore, a relation between the detection waveforms becomes similar to that shown in FIG. 6(*c*), except the frequency thereof which is doubled. Thus, the frequency of the detection pulse output from the comparator 461*b* is also twice that shown in FIG. 6(*d*) and its period is one half of that shown in FIG. 6(*d*). Since, in this case, only one side is detected, the frequency or period of the detection signal is the same as that shown in FIG. 6.

The 1-bit/2-bit converter circuit 468 is constructed with an OR gate 468*a*, a delay circuit 468*b* and a one-shot circuit 468*c*. The OR gate 468*a* sends a one-bit output to the error memory 463 when the error detector circuit 462 outputs a pulse. On the other hand, the delay circuit 468*b* delays the output pulse by a time corresponding to one bit period (one bit of the write data) which corresponds to the frequency $2f_O$ and supplies it to the one-shot circuit 468*c*, upon which the one-shot circuit 468*c* outputs one bit which is supplied to one input of the OR gate 468*a*. The OR gate 468*a* outputs a 2-bit output upon 1-bit error detection output supplied from the error detector circuit 462 to another input thereof and the 2-bit output is supplied to the error memory 463 as an error detection bit.

Thus, the error detector circuit 462 can detect an error at the frequency $2f_O$ corresponding to the write data bit period T as in the case of the conventional certifier. In this case, a clock period for the error data stored in the error memory 463 is T/2 and its frequency is $4f_O$.

Figure 2:
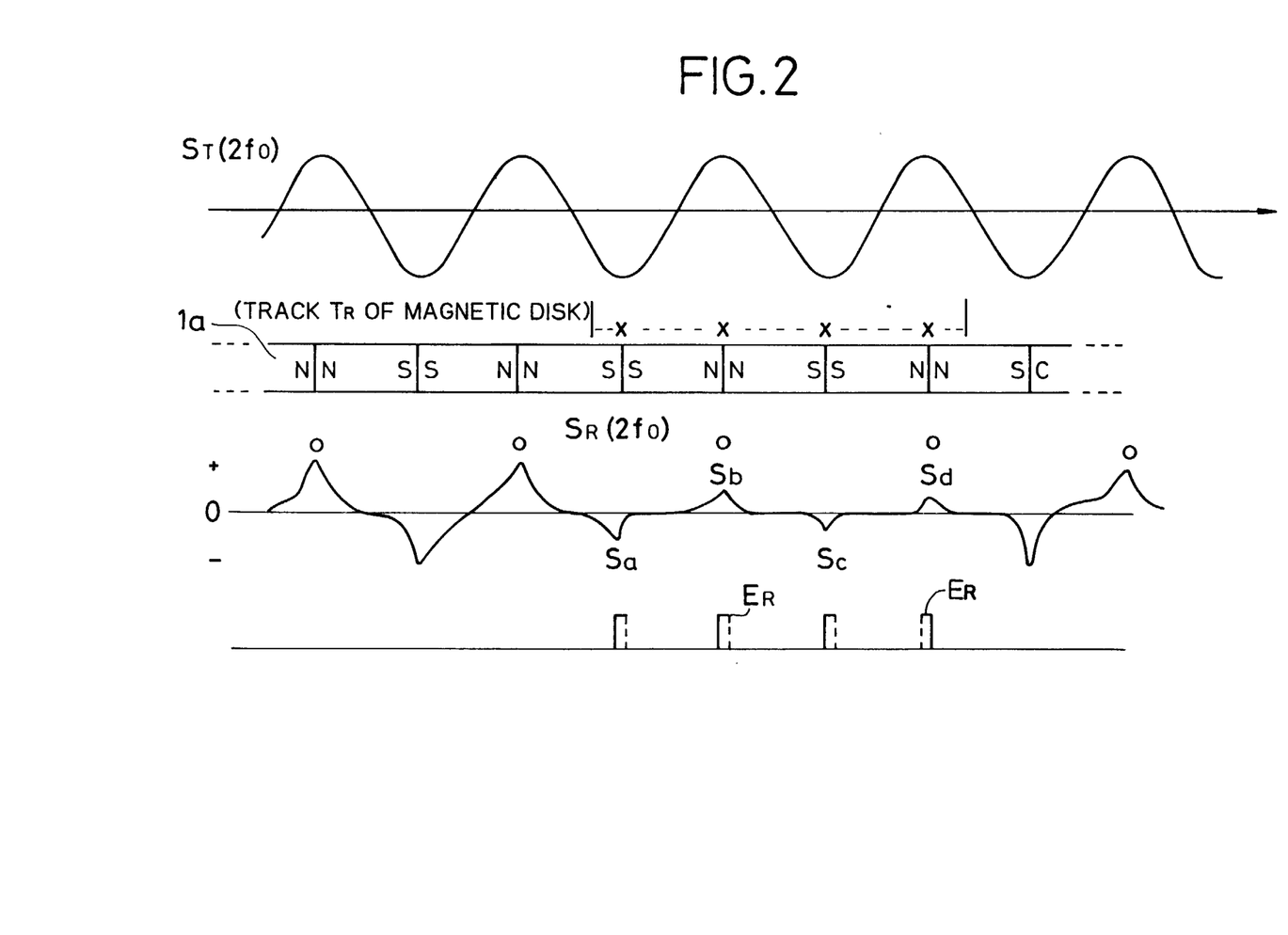
FIG. 2 shows waveforms for explaining a nature of a defect of a magnetic disk.

In FIG. 2, a reference numeral 1*a* depicts a portion of a track $T_R$ of the magnetic disk 1. When the test signal $S_T(2f_O)$ is written in the track portion 1*a* including a plurality of segments, the segments of track portion 1*a* are magnetized N, S, N, S and so on sequentially corresponding to respective bits of the write data. It is assumed that, in a range of the track portion, there are successive points of track portion, which are indicated by symbol X and correspond to respective positive and negative peaks of the test signal, in which memory performance of the magnetic disk is degraded and the magnetization of the track portion becomes insufficient. This is the defect of the magnetic disk 1. When this test signal is read out, peak values Sa, Sb, Sc, Sd ... of the read-out signal $S_R$ in that range are smaller than a normal value.

In the comparator 461*b*, the positive side waveform of the read-out signal $S_S(2f_O)$ is detected as it is, the bits of the recorded data are skipped every bit but one, the positive side waveform indicated by a symbol ○ is compared and detected and the positive side waveform Sb is detected as defective waveform. In this case, assuming that a subsequent negative side waveform Sc adjacent to the positive side waveform Sb is defective, an error detection bit therefor is produced by the 1-bit/2-bit converter circuit 468. Since the positive waveform train is selected even when a number of the positive side and negative side defects appear successively, the negative side defects are detected simultaneously. As a result, successive defects are detected.

On the contrary, when there is only one discrete defect waveform portion, non-defect waveform portions succeeding thereto may be deemed as defect waveform portions. However, such case is very rare in the high density recording and does not substantially affect the reliability of the certifier so far.

It may be possible to realize the 1-bit/2-bit converter circuit 468 by a software program. In such case, it is possible to remove the 1-bit/2-bit converter circuit 468 and supply the output of the error detector circuit 462 to the error memory 463 as shown by dotted arrows in FIG. 1. In the latter case, the memory capacity of the error memory 463 is made the same as that of the conventional certifier shown in FIG. 4 and the timing signal T of the 1/2 frequency divider circuit 467 is supplied to the error memory 463, so that a defect bit information is obtained in the error memory 463 at the frequency $2f_O$ with using a similar circuit construction to that of the conventional certifier. Then, the data obtained from the error memory 463 is processed on the side of the CPU 48 to convert 1-bit error into 2-bit error according to a conversion processing program. Such conversion processing program is stored in the memory 50. In a case where the data is processed according to the conversion processing program, it is possible to add one bit to a header of the data or it is possible to add (n−1) bit to both the header and an end of the data to thereby make the data n bits totally. The latter is effective in a second embodiment to be described later with reference to FIG. 3. Since such processing program for enlarging the data by adding a predetermined number of bits may be realized simply by using a known program for adding and processing error bits, detailed description thereof is omitted.

Figure 3:
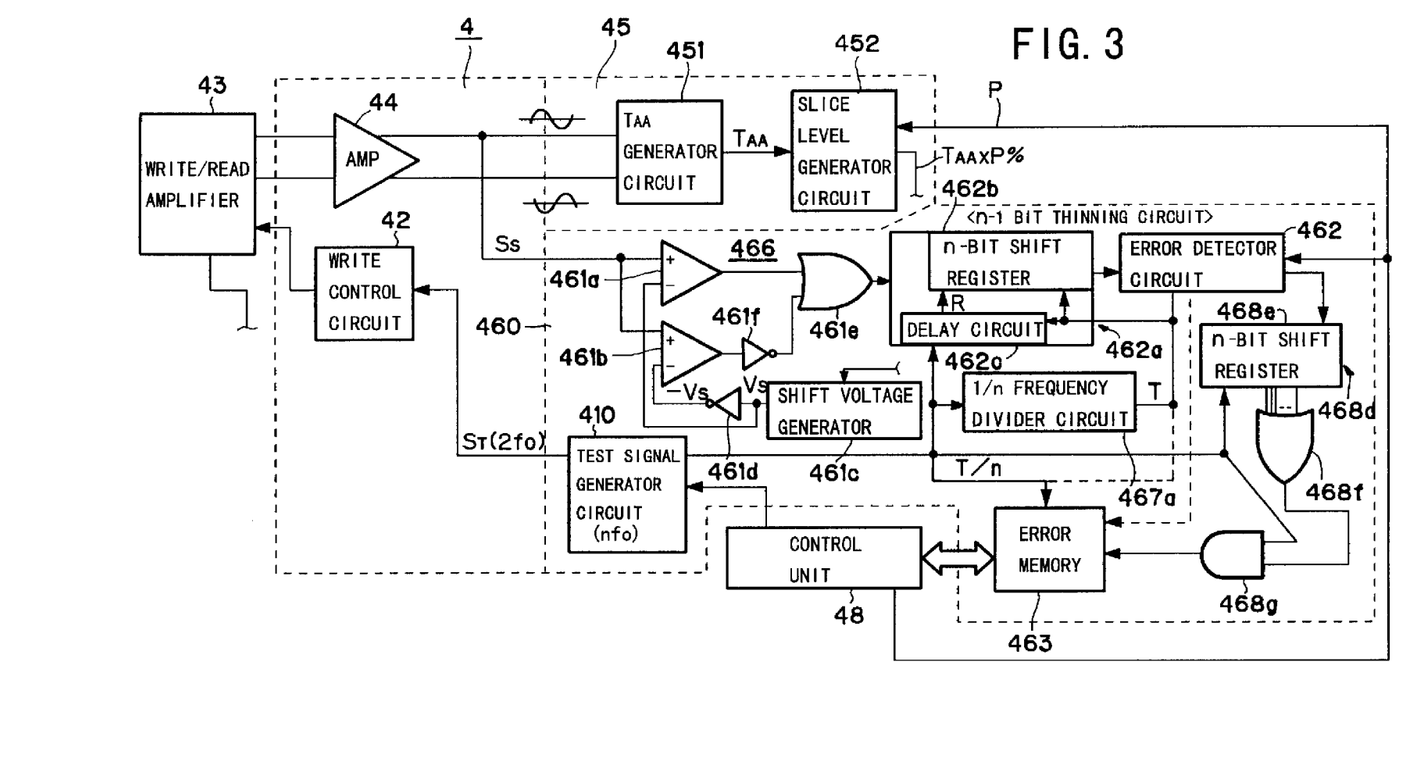
FIG. 3 is a block circuit diagram of the magnetic disk certifier according to a second embodiment of the present invention.

FIG. 3 is a block circuit diagram of the second embodiment of the present invention, in which the frequency of the test signal is $nf_O$ where n is an integer equal to or larger than 2. The second embodiment differs from the first embodiment shown in FIG. 1 in that a test signal generator circuit 410a for generating a test signal having a frequency $nf_O$ is used instead of the test signal generator circuit 410, a waveform comparator circuit 466 including comparators 461a and 461b having threshold values $+V_S$ and $-V_S$, respectively, for performing error detection which are similar to the conventional circuit construction disclosed in the previously mentioned U.S. patent application Ser. No. 08/771,156 are provided instead of the single comparator 461b in FIG. 1, a 1/n frequency divider circuit 467a is used instead of the 1/2 frequency divider circuit 467 and a 1-bit/n-bit converter circuit 468d is used instead of the 1-bit/2-bit converter circuit 468. Further, a (n−1) bit thinning circuit 462a for receiving an output of the 1/n frequency divider circuit 467a is provided on an input side of the error detector circuit 462.

The waveform comparator circuit 466 comprises the comparators 461a and 461b, as mentioned above. An inverter 461f is provided between the comparator 461b and an OR gate 461e which provides a logical sum of outputs of the comparators 461a and 461b and an output of the OR gate 461e is sent to the thinning circuit 462a. An output of the thinning circuit 462a is sent to the error detector circuit 462. The comparator 461a detects the read-out signal $S_S$ exceeding the voltage value $+V_S$ and the comparator 461b detects the read-out signal $S_S$ below the voltage value $-V_S$.

Incidentally, the thinning circuit 462a converts the output signal of the OR gate 461e into a signal having period which is n times that of the output signal of the OR gate 461e.

The test signal generator circuit 410a generates the test signal $S_T$ having frequency $nf_O$, and a test data obtained through a write control circuit 42, a write/read amplifier 43 and a magnetic head on the basis of the test signal is written in the magnetic disk 1. The test data read out from the magnetic disk 1 through the magnetic head and the write/read amplifier 43 are amplified as read-out signals by the amplifier 44 and the read-out signal Ss (frequency $nf_O$) is supplied to the waveform comparator circuit 461a shown in FIG. 3.

The output of the waveform comparator circuit 466 is supplied through the OR gate 461e to the (n−1) bit thinning circuit 462a. Thus, (n−1) detection pulses of the n detection pulses shown in FIG. 6(c) are thinned by the (n−1) thinning circuit 462a and the remaining one detection pulse is output to the error detector circuit 462. Since the number of error detection bits becomes 1/n by the (n−1) bit thinning circuit 462a, the error detection at the frequency similar to that used in the conventional certifier becomes possible and to store n bits in the error memory through the 1-bit/n-bit converter circuit 468d. This expansion to n bits may be performed by a program processing in the control unit 48 as mentioned previously and is able to remove the 1-bit/n-bit converter circuit.

As mentioned, the (n−1) bit thinning circuit 462a functions to thin (n−1) bits from the n comparison result bits obtained from the waveform comparator circuit 466 to thereby provide only one bit. The (n−1) thinning circuit 462a comprises a n-bit shift register 462b and a delay circuit 462c and operates to sequentially shift the timing signal T/n from the test signal generator circuit 410a bit by bit every output of the waveform comparator circuit 466 and the shift register 462b stores a data of n bits. The shift register 462b outputs a first bit of the n bit data in response to the output signal T of the 1/n frequency divider circuit 467a and, thereafter, reset through the delay circuit 462c. Thus, it is possible to output a header bit every n bits and to thin the (n−1) bits stored subsequent thereto by resetting.

The 1-bit/n-bit converter circuit 468d comprises an n-bit shift register 468e, an OR gate 468f and an AND gate 468g. The n-bit shift register 468e is supplied with the timing signal T/n from the test signal generator circuit 410a and an output of the error detector circuit 462 and sends logical sum outputs of the respective digits through the OR gate 468f to the AND gate 468g to send the output of the AND gate 468f in response to the timing signal nT to the error memory 463 as the error detection bits.

Thus, the test at the test frequency $nf_O$ becomes possible. Of course, n can be 2 as in the first embodiment shown in FIG. 1. When n is an even number, the (n−1) bit thinning circuit 462a selects the output of either one of the comparators 461a and 461b as the error detection bit. On the other hand, when n is an odd number, the outputs of the comparators 461a and 461b are selected alternately by the (n−1) bit thinning circuit 462a as the error detection bit.

Incidentally, since the circuit construction from the read-out circuit to the comparators is usually the analog circuit construction including the amplifier mainly, that circuit construction can be operated at high frequency. On the other hand, when the error detector circuit is to be operated at high frequency, the timing width becomes severe and the possibility of erroneous detection may be increased. In the present invention, however, since the error detector circuit is operated at frequency $f_O$ even when the test signal frequency is $nf_O$, there is no such problem. Therefore, it is possible to test a magnetic disk by means of the error detector circuit similar to the conventional circuit by recording the signal having higher test signal on the magnetic disk.

As described hereinbefore, the comparator 461b of the first embodiment shown in FIG. 1 may be replaced by the comparator 461a or 461b of the second embodiment shown in FIG. 3. On the contrary, the comparators 461a and 461b of the second embodiment can be replaced by the comparators 461a and 461b of the conventional waveform comparator shown in FIG. 5.

What is claimed is:

1. A magnetic disk certifier for detecting a missing error or a spike error of a predetermined test data by writing the predetermined test data according to a test signal in a magnetic disk, reading the test data to obtain a read-out signal and comparing the read-out signal with a predetermined signal or a predetermined reference level, said magnetic disk certifier comprising:

a write circuit for writing the test data having a period which is 1/n of a bit period of the test data an error of which is to be detected, where n is an integer equal to or larger than 2;

a read circuit for reading out the test data written in said magnetic disk;

a comparator circuit for producing a detecting signal by comparing the read-out signal read out from said read-out circuit with the predetermined signal or the predetermined reference level; and an error detector circuit for detecting an error by receiving the detection signal from said comparator circuit with a period which is n times the bit period of the test data written in said magnetic disk, a bit data being used as an error signal by converting one bit of a bit data of the error detected by said error detector circuit into n bits.

2. A magnetic disk certifier as claimed in claim 1, wherein said comparator circuit detects whether or not a level of the read-out signal exceeds the predetermined reference level by comparing the read-out signal with the predetermined reference level.

3. A magnetic disk certifier as claimed in claim 1, wherein said read circuit generates a positive phase signal as the read-out signal and a negative phase signal as the predetermined signal, and said comparator circuit receives the positive phase signal and the negative phase signal from said read-out circuit and detects crossings of either one of a positive side signal and a negative side signal of the positive phase signal with respect to a first amplitude reference level and the other side signal of the negative phase signal with respect to a second amplitude reference level.

4. A magnetic disk certifier as claimed in claim 3, further comprising conversion means for converting each bit of the bit signal into n bits to increase the number of bits of the bit signal n times, and wherein said error detector circuit outputs a bit signal indicative of an existence or absence of an error as an error signal.

5. A magnetic disk certifier as claimed in claim 4, wherein said comparator detects the crossings the negative side of the positive phase signal with respect to the first amplitude reference level and the positive side of the negative phase signal with respect to the second amplitude reference level and the crossings of the negative side of the negative phase signal with respect to the first amplitude reference level and the positive side of the positive phase signal with respect to the second amplitude reference level.

6. A magnetic disk certifier as claimed in claim 5, wherein the first amplitude reference level is set above a ground level by a predetermined value, the second amplitude reference level is set below the ground level by the predetermined value, said comparator circuit comprises a first and second comparators, said first comparator detects crossings of negative side portions of the positive phase signal with respect to the first amplitude reference level and positive side portions of the negative phase signal with respect to the second amplitude reference level and said second comparator detects crossings of negative side portions of the negative phase signal with respect to the first amplitude reference level and positive side portions of the positive phase signal with respect to the second amplitude reference level.

7. A magnetic disk certifier as claimed in claim 6, further comprising a thinning circuit for thinning (n−1) detection outputs of n detection outputs of said first and second comparators and sending a resultant one detection output of said thinning circuit to said error detector circuit, and wherein said conversion means comprises a bit conversion circuit for converting 1 bit of the bit signal from said error detector circuit into n bits.

8. A magnetic disk certifier as claimed in claim 6, wherein n is 2, said comparator circuit comprises either one of said first and second comparators and said conversion means comprises a bit conversion circuit for converting each bit of the bit signal from said error detector circuit into 2 bits.

9. A magnetic disk certifier as claimed in claim 8, further comprising an error memory, wherein the resultant one detection output of 2 bits from said bit conversion circuit is stored in said error memory with a timing corresponding to the period of the test data written in said magnetic disk.

10. A magnetic disk certified as claimed in claim 6, further comprising an error memory, wherein the bit signal from said error detection circuit is stored in said error memory with a timing corresponding to n times of the period of the test data written in said magnetic disk and said conversion means comprises a program to be executed by a processor converts each bit of the bit signal indicative of an error recorded in said error memory into n bits to increase the number of bits of the bit signal n times.

11. A magnetic disk certifier as claimed in claim 2, wherein the predetermined reference level is a first voltage level set above a ground level and a second voltage level set below the ground level, said comparator circuit comprises a first and second comparators, said first comparator compares the first voltage level with the read-out signal and detects the read-out signal exceeding the first voltage level, said second comparator compares the read-out signal with the second voltage level and detects the read-out signal below the second voltage level.

12. A magnetic disk certifier as claimed in claim 11, wherein said error detector circuit outputs the bit signal indicative of presence or absence of an error as the error detection signal and comprises conversion means for increasing each bit of the bit signal to n bits.

13. A magnetic disk certifier as claimed in claim 12, further comprising an error memory and a thinning circuit for thinning (n−a) detection outputs of n detection outputs of said first and second comparators and sending a resultant one detection output of said thinning circuit to said error detector circuit, and wherein the bit signal from said error detection circuit is stored in said error memory with a timing corresponding to n times of the period of the test data stored in said magnetic disk and said conversion means converts each bit of the bit signal stored in the error memory and indicative of the error into n bits according to a program to be executed by a processor.

* * * * *